United States Patent [19]
Anderson et al.

[11] Patent Number: 4,975,998
[45] Date of Patent: Dec. 11, 1990

[54] FLUID LEVEL MEASURING STICK CLEANING DEVICE (DIP-SQUEEZE)

[76] Inventors: Kevin B. Anderson, 3401 Amherst #210, Bedford, Tex. 76021; Endalkachew Sebhatu, 3031 Ravine Tr., Carrolton, Tex. 75007

[21] Appl. No.: 485,633

[22] Filed: Feb. 27, 1990

[51] Int. Cl.⁵ ..................... F01M 11/12; G01F 23/04
[52] U.S. Cl. ..................................... 15/210 B; 33/725
[58] Field of Search ................. 33/725, 722; 15/210 B

[56] References Cited

U.S. PATENT DOCUMENTS

| | | | |
|---|---|---|---|
| 1,814,075 | 7/1931 | Burkhardt | 33/725 |
| 1,951,079 | 3/1934 | Zihlman | 15/210 B |
| 2,029,672 | 2/1936 | Rankin | 33/725 |
| 2,654,109 | 10/1953 | Barnes | 15/210 B |
| 2,659,922 | 11/1953 | Klein | 15/210 B |
| 3,205,525 | 9/1965 | Birtzer | 15/210 B |
| 3,460,181 | 8/1969 | Denver | 15/210 B |
| 3,686,702 | 8/1972 | Jordan | 33/725 |
| 4,017,935 | 4/1977 | Hernandez | 33/725 |
| 4,506,402 | 3/1985 | Long, Jr. | 15/210 B |

*Primary Examiner*—Thomas B. Will

[57] ABSTRACT

A rectangular box with an opening at a small end contains a bent strip of flexible material around which is wrapped absorbment material. A fluid level measuring stick is inserted between these two end. A lever is pushed and brings the two ends of the flexible strip together. The stick is then removed, leaving its residue behind on the absorbment material. When the lever is released, the strip and lever resume their original position. The whole device is held in a fixed position by adhesive that is on the bottom of the box.

2 Claims, 3 Drawing Sheets

FLUID LEVEL MEASURING STICK CLEANING DEVICE (DIP-SQUEEZE)

BACKGROUND OF THE INVENTION

1. Field of the Invention

The present invention pertains to a cleaning device for fluid level measuring sticks. More specifically, the present invention pertains to a cleaning device for fluid level measuring sticks for internal combustion engines.

2. Description of Related Art

Cleaning internal combustion engine fluid level measuring sticks (such as oil dip sticks found in automobile engines) is messy, inconvenient, and harmful to the environment.

It is messy because one can easily get the fluid on fingers and clothing from the measuring stick itself, while actually cleaning the stick, and from the contaminated material used to wipe off the stick.

It is inconvenient because one must search for a rag, paper towel, or such material to clean the stick.

It is harmful to the environment because the cleaning material is so messy after use it is often discarded on the ground rather than carried to a trash can. If the material is washable, such as an oil rag, the water used becomes contaminated and reenters the environment.

No device to date solves all 3 problems at once.

SUMMARY OF THE INVENTION

The principle object of the present Invention is to provide a device for cleaning internal combustion engine fluid level measuring sticks with a minimum of mess, inconvenience, and is environmentally safe.

It is also the object of the present invention to provide such a device which is of simple, inexpensive construction, and easy to operate.

Another object is to provide a device that can be placed near the fluid level measuring sticks such as under the hood of a car for easy accessability.

The foregoing objects can be accomplished by inserting a fluid level measuring stick into a cleaning device. In the preferred embodiment of the Invention the device is in the shape of a rectangular box that is open at one end. Inside the box is a strip of flexible material such as plastic. This strip begins at the open end against the top of the box. It then travels along the top towards the closed end where it bends and then travels across the bottom back towards the open end. Around the strip is wrapped an absorbment material such as paper. Also inside the box is a lever that when pressed brings the top half of the strip down into contact with the bottom half. When the stick is inserted the lever is pushed, thereby enclosing the stick. The stick is then pulled out leaving the residue inside the device. When the lever is released the strip springs back to its original position.

With adhesive material such as double back tape device can be placed near the measuring sticks for convenience.

DETAILED DESCRIPTION

Figure 1:
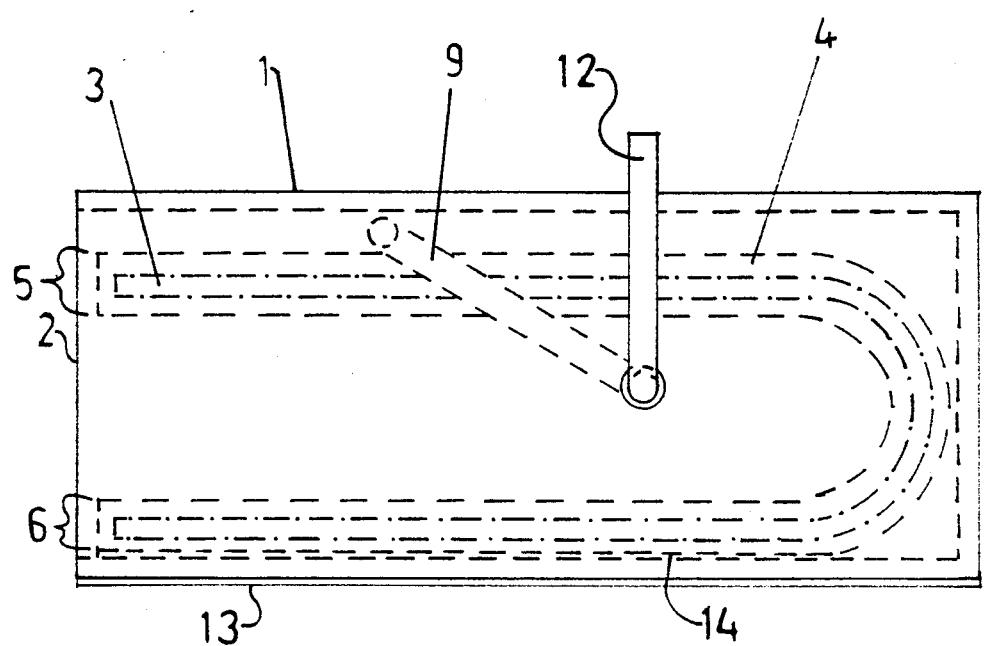
FIG. 1 is a side elevation of a fluid level measuring stick cleaning device in accordance with the present invention.

As shown in the drawings, the preferred fluid level measuring stick cleaning device in accordance with the present invention includes a container, preferably a box 1 of rectangular shape which is of molded plastic material. The box 1 is open at one end 2. Inside the box 1 is a flat, straight strip of flexible material 3 such as plastic that is bent in the middle. Around this strip 3 is wrapped an absorbment material such as paper 4. As an alternative, a strip of absorbment material may be attached by means of adhesive along the innerface of the strip. The strip of flexible material 3 forms an upper arm 5 and a lower arm 6. Preferably, the height of the open end 2 is the same as the distance between the arms 5 and 6. The width of the open end 2 is the same as the width of the arms 5 and 6. The length of the arms 5 and 6 are long enough to reach the open end 2 but not to exceed it.

Figure 2:
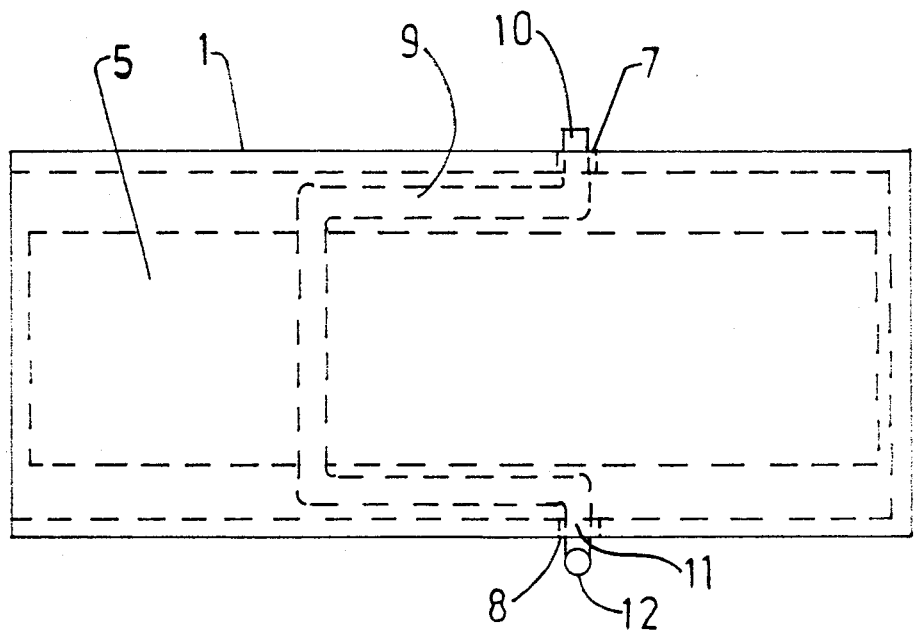
FIG. 2 is a birdseye view of the device in FIG. 1.

As best seen in the birdseye view of FIG. 2, there are holes 7 and 8 in the sides of the box. Around the upper aram 5 is a yoke 9 that is preferrably of a strong material such as metal in wire form. One end of yoke 9 forms a hinge 10 that fits in the left hole 7. This yoke 9 fits around the upper arm 5 and then forms hinge 11 that becomes the vertical lever arm 12. Preferably, the angle between the lever arm 12 and the yoke 9 is about 60 degrees. Between the lower arm 6 and the box 1 there is double back tape 14 to hold the lower arm 6 in a fixed position.

On the bottom of box 1 is an adhesive material 13, such as double back tape.

Figure 3:
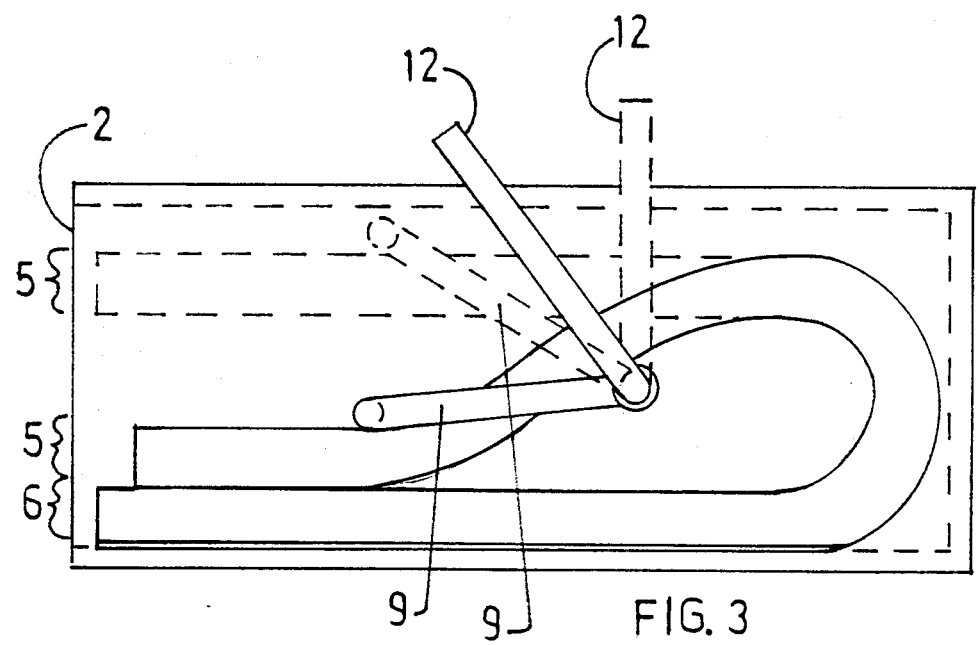
FIG. 3 is a side elevation of the present invention in actual use.

FIG. 3 shows the present device in use. The lever arm 12 is pushed in the direction of the open end 2. This causes the downward motion of yoke 9. In turn, the yoke 9 pushes the upper arm 5 downward to meet the lower arm 6. When the lever arm 12 is released the natural tendency of the flexible material 3 to go back to its original flat shape forces the upper arm 5, the yoke 9, and the lever arm 12 back to the starting position of FIG. 1.

The way the present device cleans a fluid level measuring stick is as follows. When the present device is in the position of FIG. 1, the stick is placed between the upper arm 5 and the lower arm 6. The lever arm is then pushed towards the open end 2 and lodges the stick between arms 5 and 6. The stick is then pulled out, leaving the residue on the absorbment material 4. The lever arm 12 is then released and automatically resumes its starting position.

Because of the adhesive material 13 along the bottom of the device it can be placed closed to the fluid level measuring stick (such as under the hood of a car).

The foregoing description of the preferred embodiment of the invention has been presented for the purpose of illustration and description. It is not intended to be exhaustive or limit the invention to the precise form disclosed. Many modifications and variations are possible in light of the above teaching. It is intended that the scope of the invention be limited not by this detailed description, but rather by the claims appended hereto.

We claim:

1. A fluid level measuring stick cleaning device comprised of a container opened at one end and including two oppositely spaced holes formed in the sides thereof, a strip of flexible material, said strip being bent in said container so as to form first and second arms with the opening formed between the arms facing the opening in said container, absorbent means located in the opening formed between said arms, a yoke formed from a strong material, said yoke pivotally extending between said two holes while passing between the container side wall and said first arm, one end of said yoke passing through one of said holes and bending upwards to form a lever, said lever extending in a direction to form an angle with said yoke, said second arm being attached to the inside of said container and securing means attached to the outside of said container.

2. The device of claim 1 wherein the absorbent means is an absorbent material wrapped around said strip.

* * * * *